Patented June 25, 1940

2,205,885

UNITED STATES PATENT OFFICE 2,205,885

PREPARATION OF ACETYLENIC ACIDS

Donald R. Jackson and Thomas H. Vaughn, Niagara Falls, N. Y., assignors to Union Carbide and Carbon Research Laboratories, Inc., a corporation of New York No Drawing. Application February 25, 1938, Serial No. 192,502

20 Claims. (Cl. 260—533)

This invention relates to the production of acetylenic acids, and more especially it concerns a process for the production of propiolic acid by reacting carbon dioxide and a suspension of sodium acetylide in liquid media.

More or less successful attempts have been made in the past to produce propiolic acid utilizing various difficultly securable and costly starting materials, such as the acetylene Grignard reagent. Furthermore, in efforts heretofore made to produce this acid from more readily available starting materials, dry sodium acetylide has been treated with carbon dioxide, either under atmospheric or superatmospheric pressure. However, while propiolic acid may be produced in limited and variable yields by certain of such processes, the use therein of dry sodium acetylide is subject to many hazards, and its use in conjunction with carbon dioxide, especially under superatmospheric pressures, gives unreliable results, accompanied by charring, and often even by explosive decomposition of the products. Experiments conducted for the purpose thus far have failed to establish the cause of these erratic results, secured when using dry sodium acetylide, which render impracticable the development of a commercial process utilizing the dry material.

In an attempt to devise a controllable process for the utilization of carbon dioxide in converting sodium acetylide to propiolic acid, Straus and Voss mixed sodium acetylide with ten times its weight of sea sand (dried) and treated this mixture in successive pressure stages with carbon dioxide, first, under atmospheric pressure for twenty-four hours—after which the full pressure of the tank of liquid carbon dioxide was applied to the said mixture for twenty days or more. While apparently uncontrolled reaction and decomposition of the propiolic acid were prevented, the reaction required a very long time for its completion. The preliminary dilution of the reactants with sand renders such process impracticable for commercial use.

The present invention is based upon applicants' discovery that it is possible to control the reaction between sodium acetylide and carbon dioxide and substantially to prevent decomposition and charring of the reaction products, even when conducted entirely under high superatmospheric pressure—providing that the said acetylide is suspended in a suitable liquid, and the mixture of reactants is thoroughly agitated during the time of reaction. No preliminary treatment of the sodium acetylide with carbon dioxide at atmospheric pressure or below is necessary. Indeed, high pressure carbon dioxide may be immediately applied without danger of carbonization of the charge.

The sodium acetylide employed preferably should be as pure as possible; and it is particularly desirable that it be substantially free from sodium hydroxide—an impurity often present therein—since the latter reacts with carbon dioxide to produce water, which then decomposes the acetylide, yielding acetylene and regenerating sodium hydroxide.

According to one modification of the present invention, finely-divided sodium acetylide is reacted with carbon dioxide under superatmospheric pressure while the former is suspended in a suitable liquid diluent. Preferably, as the suspension medium for the sodium acetylide a liquid is used that is relatively inert toward both carbon dioxide and sodium acetylide, and which is readily removable from the components of the reaction mixture by a distillation operation or its equivalent. It is desirable that the liquid be sufficiently volatile that it susbsequently may be distilled from any acetylene dicarboxylic acid produced in the reaction.

A wide variety of volatile liquids may be employed as diluents in the process. The primary requisite is that the liquid does not react sufficiently rapidly with either of the reactants or with the resultant products to prevent or mask the desired reaction.

As satisfactory dilution media in the process may be mentioned ammonia; hydrocarbons, such as ligroin, benzene, and toluene; and mono-, di-, and poly-ethers. Liquid ammonia possesses the property of reacting somewhat with carbon dioxide; and its volatility makes necessary the use of special apparatus for handling this solvent. Hydrocarbons, on the other hand, do not react with either carbon dioxide or sodium acetylide. Dioxan, a di-ether, is a particularly advantageous solvent, being inert toward both the reactants, and readily separated and recovered from the reaction products. Moreover, it is an extremely good solvent for carbon dioxide under pressure. This materially increases the rate of the reaction between carbon dioxide and sodium acetylide. Since dioxan is miscible with water in all proportions, several means are available for working up the reaction product, such as hereinafter described. The diethyl ether of diethylene glycol, a poly-ether, also is completely miscible with water, and possesses the property of dissolving carbon dioxide under pressure.

In conducting the reaction between the sodium acetylide and the carbon dioxide, preferably the latter is passed through a suspension of the former in a body of the liquid diluent. The reaction may be conducted at any temperature below that at which any of the reactants or reaction products are unstable and, in any event, at a temperature not substantially above around 90° C. The reaction is conducted under pressures that may range from around atmospheric pressure to 2000 or more pounds per square inch. Since the reaction may be conducted at temperatures as high as 70° to 90° C. without danger of carbonization occurring, it thus is possible in the present invention, to employ both high carbon dioxide pressures and elevated temperatures, each of which contributes to materially increase the rate of reaction beyond that possible at lower temperatures, and favors the commercial development of the process.

The principal product of the initial reaction between the sodium acetylide and carbon dioxide is a suspension of the sodium salt of propiolic acid in the liquid-suspending media. This suspension may be used directly as starting material for further reactions if desired; or the sodium propiolate may be separated from the reaction mixture by a suitable method, such as by filtration, followed by washing of the sodium propiolate with a solvent in which it is insoluble, such as ethyl ether; or the free acid may be liberated and isolated in suitable manner, such as hereinafter disclosed. Thus the reaction mixture may be treated with water to decompose any unreacted acetylide. The liquid diluent and suspension medium are then separated from the aqueous solution of sodium propiolate and sodium hydroxide; and the solution then is treated with an excess of dilute sulphuric acid to liberate the free propiolic acid. The propiolic acid then is extracted from the aqueous solution by means of a suitable solvent, such as diethyl ether. The ether extract is dried and distilled under subatmospheric pressure; and the propiolic acid, distilling at 65–67° C. under an absolute pressure of 23 mm. of mercury, is separately condensed and recovered.

The use of dioxan as a reaction medium facilitates the use of the following methods for working up the reaction mixture:

(1) The sodium propiolate formed may be filtered off and subjected to suitable treatment for its purification.

(2) The reaction mixture may be acidified directly with a dilute aqueous mineral acid. By keeping the amount of water small, the bulk of the sodium sulphate produced is precipitated in a substantially anhydrous form and may be filtered off. Upon distillation of the filtrate, a constant boiling mixture of dioxan and water comes over first, followed by a similar mixture of dioxan and propiolic acid. In instances where sufficient water is added to the reaction mixture to dissolve the sodium sulphate and cause separation of two liquid layers, the dioxan layer is separated, and thereafter the water layer is extracted with a suitable water-immiscible solvent. Propiolic acid is then isolated from the dioxan layer and from the said extract by distillation.

(3) The reaction mixture may be treated with water directly, the resulting solution then being distilled, preferably under subatmospheric pressure, until all of the dioxan has been removed as a constant boiling mixture with water. The remaining aqueous solution of sodium propiolate is acidified with a mineral acid, and the solution is extracted with a suitable water-immiscible solvent such as diethyl ether. Pure propiolic acid is recovered from the resultant extract by distillation.

Propiolic acid forms with dioxan a constant boiling mixture which contains approximately 76% of propiolic acid. This mixture boils between 158° and 160° C. with partial decomposition at atmospheric pressure, and at approximately 77° C. under an absolute pressure of 30 mm. of mercury. Pure propiolic acid can be isolated from this mixture by neutralizing the same with an aqueous solution of a caustic alkali. The dioxan is then removed by distillation as a constant boiling mixture with water, preferably conducted at a pressure such that the temperature of the liquid does not exceed 60° C. The propiolic acid is then isolated from the residual aqueous solution of sodium propiolate by treatment with an excess of a strong mineral acid, followed by extraction of the acidified solution with ether and distillation of the extract. Propiolic acid when isolated by method (2) supra tends to decompose partially near the end of the distillation. This decomposition may be inhibited by distilling at a pressure such that the temperature of the liquid being distilled does not exceed 70° C.

When employing as a reaction medium the diethyl ether of diethylene glycol, or other medium forming a constant boiling mixture with propiolic acid, the latter may be recovered in manner generally similar to that described above for use when dioxan is employed. Thus the constant boiling mixture of propiolic acid with the said glycol ether contains approximately 23% of propiolic acid. It boils at 64° to 65° C. under an absolute pressure of 2 mm. of mercury; and with partial decomposition between 175° and 180° C. at atmospheric pressure. For recovering propiolic acid from this constant boiling mixture, the latter is neutralized with an aqueous solution of a caustic alkali, after which the said glycol ether is extracted from the aqueous solution with a suitable water immiscible solvent such as diethyl ether. The pure propiolic acid then is isolated and recovered from the aqueous solution of sodium propiolate by treatment with an excess of a strong mineral acid, followed by extraction of the acidified solution with a water-immiscible solvent and distillation of the resultant extract. Where pure propiolic acid is desired, it is preferred to employ the separation procedure at the end of the carbonation step, thereby removing the solvent before the propiolic acid has been liberated from its salt, and preventing the formation of constant-boiling mixtures.

In addition to the sodium propiolate, small amounts of the sodium salt of acetylene dicarboxylic acid also are obtained. This acetylenic acid is readily separated from propiolic acid in the above-mentioned distillation, the acetylene dicarboxylic acid remaining behind in the still as a solid residue.

Some acetylene dicarboxylic acid generally separates as an impure solid near the end of the propiolic acid distillation step. This solid preferably should be filtered off before distillation is continued. It has a dark brown color; and may be purified by dissolving it in ether, from which a part of the impurities is precipitated by the addition of benzene. The purified product is then recovered by pouring the ether solution into ligroin. In an alternate method of purification, most of the impurities may be removed from the acetylene dicarboxylic acid by extraction with boiling toluene, after which the residue is dissolved in diethyl ether and reprecipitated with ligroin.

It is highly desirable, in the interest of high yields of propiolic acid and the prevention of decomposition of the reactants, that the latter be thoroughly and continuously agitated while in contact with each other under reaction conditions, and that substantial losses of the liquid diluent be prevented during the course of the primary reaction.

A liquid diluent which also functions as an extractant for the acetylenic acids may be employed effectively in the process. When such a liquid, as for example diethyl ether, is utilized, it becomes unnecessary to separate this liquid from the aqueous solution of the primary reaction product before acidification of the latter for recovery of the free acetylenic acids.

The following examples will serve to illustrate the invention:

*Example 1*

A suspension of 50 grams of sodium acetylide in 150 grams of benzene was placed in a reaction bomb, provided with means for agitating the same. Gaseous carbon dioxide was admitted with agitation until a pressure of 600 pounds per square inch was reached and the pressure was held at this value for 108 hours, while the reaction bomb was continuously agitated. The reaction temperature was held at 30° C. After completion of the reaction, the reaction product was treated with water to decompose any unreacted acetylide. The benzene then was separated from the aqueous solution of sodium propiolate and sodium hydroxide, the latter of which was then treated with an excess of dilute sulphuric acid to convert the sodium salts of the acetylenic acids to the corresponding free acids. The latter were extracted from this aqueous solution by means of diethyl ether; and the ether extract was separated, dried, and distilled under vacuum. A good yield of propiolic acid distilling at 65°–67° C. under an absolute pressure of 23 mm. of mercury was obtained, together with a small amount of a solid residue consisting of acetylene dicarboxylic acid.

*Example 2*

A suspension of 50 grams of finely-divided sodium acetylide in 150 grams of benzene was saturated with carbon dioxide under a pressure of 625 pounds per square inch in a reaction bomb, while agitating the mixture of reactants and maintaining a temperature of 25° C. The temperature then was raised to and held at 70°–80° C., a pressure of 1000 pounds per square inch being developed. The reaction bomb was continuously agitated for 44 hours at the last-named temperature, after which the reaction products were treated in the manner described in Example 1, giving yields of propiolic acid and acetylene dicarboxylic acid paralleling those of Example 1.

The following example illustrates the use of liquid ammonia as a suspending medium in the process. The inherent disadvantage possessed by liquid ammonia when used in this process, due to a certain reactivity thereof with carbon dioxide, is in part offset by the advantages secured in the process because of the facts that sodium acetylide is somewhat soluble in liquid ammonia, and that carbon dioxide at atmospheric pressure may be used.

*Example 3*

A suspension of 50 grams of sodium acetylide in 1 liter of liquid ammonia at its boiling point, −34° C., was vigorously stirred while solid carbon dioxide was added thereto in successive small pieces. After the reaction mixture had reached the consistency of a paste, the liquid ammonia was allowed to evaporate. The remaining solid was dissolved in water, and the solution was treated with an excess of a dilute aqueous solution of sulphuric acid to liberate the propiolic acid from its sodium salt. The resultant aqueous solution was extracted with diethyl ether; and the resultant extract was dried and distilled under vacuum, the fraction containing the propiolic acid being separately recovered in the manner described in Example 1. A fair yield of propiolic acid was obtained.

*Example 4*

A suspension of 48 grams of sodium acetylide in 150 cc. of dioxan was treated for 16 hours in the bomb of a rocking autoclave with carbon dioxide at room temperature and under a pressure of 800 pounds per square inch. The resultant suspension of sodium propiolate in dioxan was treated with a solution of 49 grams of sulphuric acid in 98 grams of water, and the precipitate of sodium sulphate was filtered off. The resultant filtrate was distilled under absolute pressures ranging successively from 65 to 11 mm. of mercury; and the fraction comprising a constant boiling mixture of dioxan and propiolic acid was neutralized with an aqueous solution of sodium hydroxide and distilled under subatmospheric pressure, the liquid temperature during the distillation not exceeding 75° C. The residual liquid was acidified with a dilute sulphuric acid, extracted with diethyl ether, and the ether extract distilled. A practically theoretical yield of propiolic acid was secured.

*Example 5*

Sixty mols (2880 grams) of sodium acetylide suspended in 10 gallons of dioxan were treated for 20 hours at a temperature within the range between 15° and 25° C. with carbon dioxide under a pressure of 500 pounds per square inch, while the mixture was continuously agitated. The resulting suspension of sodium propiolate was filtered; and 15 liters of water were added to the filter cake to dissolve the sodium propiolate. The resultant solution was then treated with a mixture of 7840 grams of sulphuric acid in 3920 grams of water. This solution was extracted with diethyl ether, and the ether distilled off. A good yield of propiolic acid was secured from the resultant constant-boiling mixture of propiolic acid and dioxan—by means of the procedure hereinbefore described.

*Example 6*

A suspension of 48 grams of sodium acetylide in 150 cc. of the diethyl ether of diethylene glycol was treated in a rocking autoclave at room temperature with carbon dioxide under a pressure of 800 pounds per square inch for 15 hours. The product was treated with 49 grams of sulphuric acid in 50 grams of water. The resultant mixture was filtered, and the filtrate was distilled under absolute pressures ranging successively from 30 mm. to 2 mm. of mercury, yielding a constant-boiling mixture of propiolic acid with the said poly-ether, from which was secured a good yield of propiolic acid.

An important advantage of the invention resides in the fact that the sodium acetylide used as starting material may be stored and handled at all times as a suspension in the liquid diluent, thus greatly minimizing the danger inherent in its handling and storage due to its normal spontaneous inflammability. The diluting liquid remains in contact with the acetylide at all times. Furthermore, by utilizing in the process a liquid boiling at a higher temperature than benzene, the resultant suspension of sodium propiolate obtained from the carbonation step can be treated directly with an alkylating agent such as diethyl sulphate, where the production of an alkyl propiolate is sought. The use of a high-boiling solvent permits the ester to distill away as rapidly as formed, without the necessity of separating it from lower-boiler materials. The acetylenic acids produced by the present invention also may be used as starting materials for a wide variety of compounds. Thus propiolic acid may be converted to the useful acrylic and propionic acids.

Solutions of propiolic acid in water-soluble glycol ethers, such as those hereinbefore described, have important uses per se as starting materials for the synthesis of propiolic acid derivatives. The presence in the reaction mixtures containing the heat-sensitive propiolic acid of the glycol ethers such as dioxan acting as diluents during the synthesis, assist to regulate the principal reaction, and are readily recoverable after conversion of the propiolic acid. These mixtures are relatively less expensive than pure propiolic acid, and may be used advantageously as starting materials for the production of such propiolic acid derivatives as β-chloroacrylic acid.

The terms "di-ethers" and "poly-ethers" are employed in the specification and claims to designate compounds respectively containing two, and more than two, ether groupings.

The invention is susceptible of modification within the scope of the appended claims.

We claim:

1. Process for preparing an acetylenic acid, which comprises reacting carbon dioxide under superatmospheric pressure with a suspension of finely-divided sodium acetylide in a volatile liquid diluent, the said liquid being less reactive with each of the reactants than is the other reactant.

2. Process as defined in claim 1, wherein the acetylenic acid produced is propiolic acid.

3. Process as defined in claim 1, wherein the said liquid diluent is an aliphatic ether.

4. Process for preparing an acetylenic acid, which comprises reacting carbon dioxide under superatmospheric pressure with a suspension of finely-divided sodium acetylide substantially free from sodium hydroxide in a volatile liquid diluent that is relatively inert toward the said reactants, converting the sodium salt of an acetylenic acid thus produced to the free acid, and separately recovering the latter.

5. Process for preparing an acetylenic acid, which comprises reacting sodium acetylide in suspension in a volatile liquid with carbon dioxide under superatmospheric pressure and at a temperature between atmospheric temperature and 90° C. while agitating the mixture of reactants, the said liquid being less reactive with either of the reactants than is the other of said reactants.

6. Process for preparing an acetylenic acid, which comprises reacting sodium acetylide in suspension in a volatile liquid with carbon dioxide under superatmospheric pressure while agitating the mixture of reactants, the said liquid being substantially inert chemically toward the said reactants.

7. Process for preparing an acetylenic acid, which comprises reacting sodium acetylide in suspension in a volatile liquid with carbon dioxide under superatmospheric pressure while agitating the mixture of reactants, and maintaining the reaction mixture at temperatures below 90° C. during the said reaction, the said liquid being less reactive with each of the reactants than is the other reactant.

8. Process for preparing an acetylenic acid, which comprises reacting sodium acetylide with carbon dioxide under superatmospheric pressure in the presence of a liquid non-solvent for the sodium acetylide which is inert toward the reactants but is a solvent for acetylenic acids, agitating the mixture of reactants during the said reaction, thereafter converting the sodium salt of the acetylenic acid thus produced to the free acid, while concurrently extracting the latter with the said liquid, and separately recovering from the resultant extract the free acetylenic acid.

9. Process for preparing an acetylenic acid, which comprises reacting sodium acetylide with carbon dioxide under superatmospheric pressure and at a temperature within the range between the normal boiling point of liquid ammonia and 90° C., in the presence of a liquid nonsolvent for the sodium acetylide which is inert toward the reactants and is a solvent for acetylenic acids, agitating the mixture of reactants during the said reaction, thereafter converting the sodium salt of the acetylenic acid thus produced to the free acid, while concurrently extracting the latter with the said liquid, and separately recovering from the resultant extract the free acetylenic acid.

10. Process for preparing an acetylenic acid, which comprises agitating a suspension of finely-divided sodium acetylide in a volatile liquid diluent, while introducing and reacting therewith carbon dioxide under superatmospheric pressure and while maintaining the mixture of reactants at a temperature below 90° C. during the said reaction, the said liquid being less reactive with each of the reactants than is the other reactant.

11. Process as defined in claim 10, wherein the reaction is conducted at a temperature within the range between atmospheric temperature and 90° C.

12. Process as defined in claim 10, wherein the reaction is conducted at a temperature within the range between 30° and 90° C.

13. Process for producing an acetylenic acid, which comprises agitating and reacting carbon dioxide with finely-divided sodium acetylide in suspension in a liquid diluent boiling below 0° C., the said liquid being less reactive than sodium acetylide toward carbon dioxide, removing the said liquid, converting the residual sodium propiolate to free propiolic acid, and recovering the latter.

14. Process for the production of propiolic acid, which comprises agitating and reacting finely-divided sodium acetylide in suspension in liquid ammonia with successive portions of carbon dioxide at a low temperature, removing the liquid ammonia, converting the residual sodium propiolate to the free propiolic acid, and recovering the latter.

15. As a composition of matter, a solution of propiolic acid in a water-miscible glycol ether.

16. A homogeneous propiolic acid-dioxan azeotrope containing approximately 76% of the former and boiling at approximately 77° C. under an absolute pressure of 30 mm. of mercury.

17. A homogeneous liquid mixture of propiolic acid and the diethyl ether of diethylene glycol, the said mixture containing approximately 23% of propiolic acid and boiling at 64° to 65° C. under an absolute pressure of 2 mm. of mercury.

18. Process for preparing an acetylenic acid, which comprises reacting sodium acetylide with carbon dioxide under superatmospheric pressure in the presence of a liquid nonsolvent for the sodium acetylide which is inert toward the reactants but is a solvent for acetylenic acids, agitating the mixture of reactants during the said reaction, adding water to the resultant reaction mixture, removing the said non-solvent from the sodium salt of the acetylenic acid produced, thereafter converting the said salt to the free acetylenic acid, and recovering the latter.

19. Process for preparing an acetylenic acid, which comprises reacting carbon dioxide under superatmospheric pressure and at a temperature between atmospheric temperature and 90° C. with a suspension of finely-divided sodium acetylide in an aliphatic di-ether.

20. Process for preparing an acetylenic acid, which comprises reacting carbon dioxide under superatmospheric pressure and at a temperature between atmospheric temperature and 90° C. with a suspension of finely-divided sodium acetylide in dioxan.

DONALD R. JACKSON.
THOMAS H. VAUGHN.